(12) United States Patent
Xiao et al.

(10) Patent No.: US 11,144,064 B2
(45) Date of Patent: Oct. 12, 2021

(54) METHOD FOR CONTROLLING MOTION OF ROBOT BASED ON MAP PREDICTION

(71) Applicant: AMICRO SEMICONDUCTOR CO., LTD., Guangdong (CN)

(72) Inventors: Gangjun Xiao, Guangdong (CN); Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 251 days.

(21) Appl. No.: 16/604,576

(22) PCT Filed: Apr. 11, 2017

(86) PCT No.: PCT/CN2017/080137
§ 371 (c)(1),
(2) Date: Oct. 11, 2019

(87) PCT Pub. No.: WO2018/187944
PCT Pub. Date: Oct. 18, 2018

(65) Prior Publication Data
US 2020/0133291 A1    Apr. 30, 2020

(51) Int. Cl.
*G05D 1/02* (2020.01)
*B25J 11/00* (2006.01)
(52) U.S. Cl.
CPC ......... *G05D 1/0238* (2013.01); *G05D 1/0214* (2013.01); *B25J 11/008* (2013.01)
(58) Field of Classification Search
CPC .... G05D 1/0238; G05D 1/0214; B25J 11/008
See application file for complete search history.

(56) References Cited

U.S. PATENT DOCUMENTS

| 7,853,372 | B2 * | 12/2010 | Park | G05D 1/0272 |
|---|---|---|---|---|
| | | | | 701/23 |
| 9,408,514 | B1 | 8/2016 | Alexander et al. | |
| 10,788,836 | B2 * | 9/2020 | Ebrahimi Afrouzi | ...................... |
| | | | | G05D 1/0212 |
| 2005/0171644 | A1 * | 8/2005 | Tani | G05D 1/0274 |
| | | | | 700/253 |

(Continued)

FOREIGN PATENT DOCUMENTS

| CN | 101238960 A | 8/2008 |
|---|---|---|
| CN | 101971116 A | 2/2011 |

(Continued)

OTHER PUBLICATIONS

Corresponding EP search results dated Sep. 10, 2020.
Corresponding EP search results dated Nov. 9, 2020.

*Primary Examiner* — Ramsey Refai
(74) *Attorney, Agent, or Firm* — Gang Yu

(57) ABSTRACT

A method for controlling a motion of a robot based on map prediction mainly carries out estimation and calculation for a wall surface by combining an external sensor with internal map information about a robot, so as at least to enable the robot to walk along the estimated wall surface. The method for controlling the motion of the robot based on map prediction can be adapted to various different wall surfaces based on map prediction, including different colors and shapes, thereby reducing an operation time; and the accuracy of map prediction can be continuously corrected during an operation process, thereby realizing a good wall-following behavior.

10 Claims, 5 Drawing Sheets

(56) References Cited

U.S. PATENT DOCUMENTS

| | | |
|---|---|---|
| 2008/0249662 A1 | 10/2008 | Nakamura |
| 2008/0294338 A1* | 11/2008 | Doh ................... G05D 1/0234 701/533 |
| 2009/0292394 A1 | 11/2009 | Hyung et al. |
| 2012/0065829 A1 | 3/2012 | Yu et al. |
| 2013/0118528 A1* | 5/2013 | Kim ................... G05D 1/0274 134/18 |
| 2014/0039676 A1* | 2/2014 | Fernando ............... G05D 1/024 700/253 |

FOREIGN PATENT DOCUMENTS

| | | |
|---|---|---|
| CN | 102138769 A | 8/2011 |
| CN | 103220955 A | 7/2013 |
| CN | 103324193 A | 9/2013 |
| CN | 103335658 A | 10/2013 |
| CN | 103376801 A | 10/2013 |
| CN | 106272420 A | 1/2017 |
| CN | 106527423 A | 3/2017 |
| CN | 106843239 A | 6/2017 |
| EP | 2515196 A | 10/2012 |
| EP | 2804065 A | 11/2014 |
| JP | 2014067223 A | 4/2014 |
| JP | 2014123200 A | 7/2014 |
| JP | 2017503267 A | 1/2017 |
| KR | 2003114719 A | 4/2003 |
| KR | 101056935 A | 8/2011 |

\* cited by examiner

METHOD FOR CONTROLLING MOTION OF ROBOT BASED ON MAP PREDICTION

TECHNICAL FIELD

The present disclosure belongs to the technical field of artificial intelligence, and in particular to relates to related art of auxiliary robots used for home life.

BACKGROUND

With the development of technology and people's pursuit of comfortable life, autonomous mobile robots are increasingly entering people's lives, such as companion robots and sweeping robots. Behaviors along a wall (edgewise) are behaviors performed by many types of robots. Along the wall, corner coverage or labyrinth escape may be achieved. The wall or wall surface along the wall should not be simply understood as the wall surface of the building. It should also include a boundary limited by furniture and so on. It should be understood as a boundary of a movable range of the robot usually.

At present, a more common way is to acquire distance information from the wall surface through a distance sensor or an infrared sensor to be along the wall. The distance sensor may accurately know the distance between the robot and the wall surface, which is a good choice, but the cost is relatively high, and there are also false detections on an uneven wall surface, so more robots use infrared sensors. The infrared sensor is easily affected by the color and unevenness of the wall surface, and good effects cannot be obtained depending on the infrared sensor.

SUMMARY

At least some embodiments of present disclosure carry out estimation and calculation for a wall surface by combining an external sensor with internal map information stored in a robot, so as at least to enable the robot to walk along the estimated wall surface. The object of the present disclosure is achieved by the following technical solutions.

In an embodiment of the present disclosure, a method for controlling a motion of a robot based on map prediction is provided, the robot in the method includes a body, left and right action wheels, a main control component, a front collision detection sensor, a left obstacle detection sensor, and a right obstacle detection sensor. The main control component has a map management function and a robot positioning function. The method includes:

step one, controlling the robot to walk toward a wall surface on a map, when the robot collides with a first touch point of an obstacle, determining whether a distance from the obstacle to the wall surface on the map is less than a set distance A, when the distance is less than a set distance A, determining a straight line L1 with the same angle as the wall surface on the map by taking a position of the obstacle currently collided as a reference point, setting the straight line L1 as a prediction wall surface, controlling the robot to walk along this prediction wall surface, and when the distance is not less than a set distance A, proceeding to step two; and step two, controlling the robot to detect a second touch point of the obstacle at an interval of the first touch point, when there is a second touch point, determining a straight line L2 according to the two touch points, setting the straight line L2 as a prediction wall surface, controlling the robot to walk along this prediction wall surface, and otherwise, returning to step one, and in a process of controlling the robot to walk along the prediction wall surface, an obstacle detection sensor, which is located at one side of the robot and relative to the prediction wall surface, is used for detecting whether the obstacle at this side is present at a set time interval T, when an obstacle signal is not detected continuously, the robot is controlled to walk along an arc-shaped route toward the inside of the prediction wall surface, and the process returns to step one.

In an optional embodiment, the interval between the two touch points is a length of the body.

In an optional embodiment, step two is further performed as follows: controlling the robot to perform at least two interval distance detections on the obstacle, when obstacle points are detected by the at least two interval distance detections, determining a straight line L2 between two obstacle points acquired by two distance detections, setting the straight line L2 as a prediction wall surface, controlling the robot to walk along this prediction wall surface, and when obstacle points are not detected by the at least two interval distance detections, returning to step one.

In an optional embodiment, step two is further performed as follows: controlling the robot to perform at least two interval touch point detections on the obstacle, when there is a second touch point, determining a straight line L2 according to a comprehensive trend of all touch points, setting the straight line L2 as a prediction wall surface, controlling the robot to walk along this prediction wall surface, and when there is not the second touch point, returning to step one.

In an optional embodiment, detecting the second touch point includes: controlling the robot to retreat from the first touch point by a set distance B, controlling the robot to rotate by a set angle Q, and controlling the robot to walk along an arc-shaped route toward a side of the obstacle to find the second touch point.

In an optional embodiment, the set distance B is one quarter of the body, the set angle Q is 90 degrees, controlling the robot to walk along an arc-shaped route toward the obstacle side includes: controlling action wheels located at a side, which is far away from the obstacle, of the robot to travel at a four-time speed relative to action wheels located at a side, which is near to the obstacle, of the robot.

In an optional embodiment, an initial length of the straight line L2 is ten times a length of the body.

In an optional embodiment, the set time interval T takes a time period when the robot walks for a distance of two times a length of the body.

In an optional embodiment, the situation that an obstacle signal is not detected continuously means that no obstacle signal is detected for two set time intervals T.

In an optional embodiment, controlling the robot to walk along the arc-shaped route toward the prediction wall surface includes: controlling the action wheels located at a side, which is far away from the prediction wall surface, of the robot to travel at a four-time speed relative to action wheels located at a side, which is near to the prediction wall surface, of the robot.

The method for controlling the motion of the robot based on map prediction provided by the present disclosure has the beneficial effects that it can be adapted to various different wall surfaces based on map prediction, including different colors and shapes, thereby reducing an operation time; and the accuracy of map prediction can be continuously corrected during an operation process, thereby realizing a good wall-following behavior.

DETAILED DESCRIPTION

The specific implementation manners present disclosure will be further described below with reference to the accompanying drawings.

Figure 1:
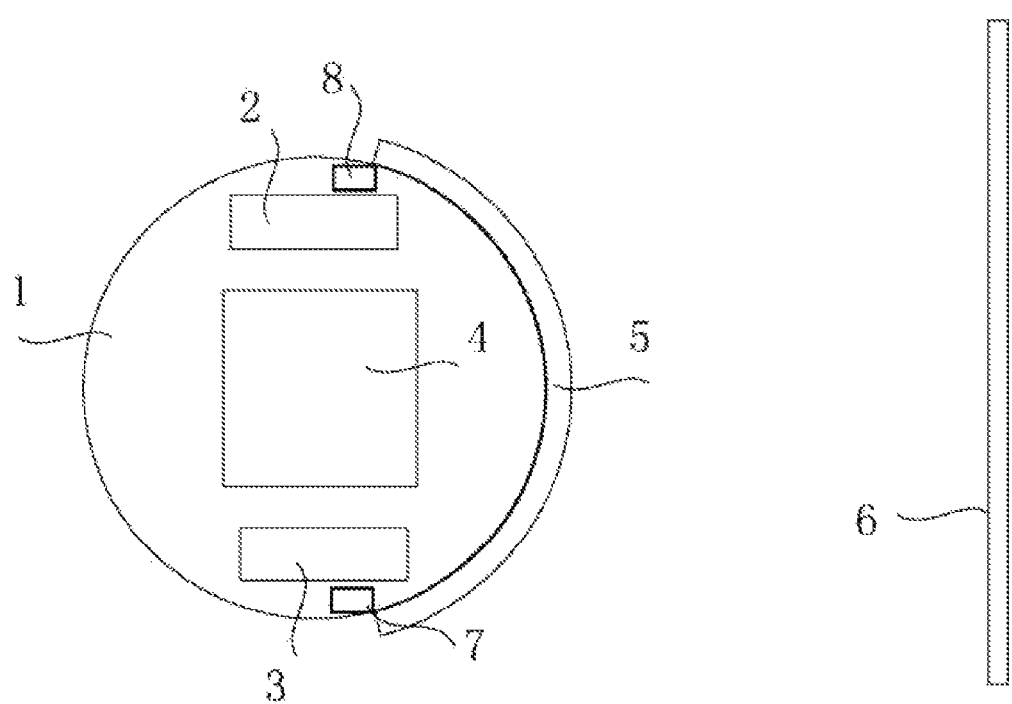
FIG. 1 is a composition schematic diagram of a robot in a method for controlling the motion of a robot based on map prediction according to an embodiment of the present disclosure.

As shown in FIG. 1, an embodiment of the present embodiment provides a method for controlling a motion of a robot based on map prediction. The robot in the method moves within a space having a wall surface 6. The robot includes a body 1, action wheels 2 and 3, a main control component 4, a collision detection sensor 5, and obstacle detection sensors 7 and 8. The collision detection sensor 5 is arranged at a front end of the body 1 for detecting a collision, and may be a physical collision detection element or an ultrasonic wave or laser non-contact detection element. The obstacle detection sensors 7 and 8 are respectively arranged on both sides of the body 1 for detecting obstacles relative to both sides of the body, and may be distance sensors based on ultrasonic waves or lasers, or sensors such as infrared sensors. The main control component 4 is configured to process various information (including information collected by each sensor and information on map establishment, storage, and use) and control the actions of the action wheels 2 and 3.

A key point of the method for controlling the motion of the robot based on map prediction provided by the present embodiment is a prediction of a wall surface, and has the following situations.

Figure 2:
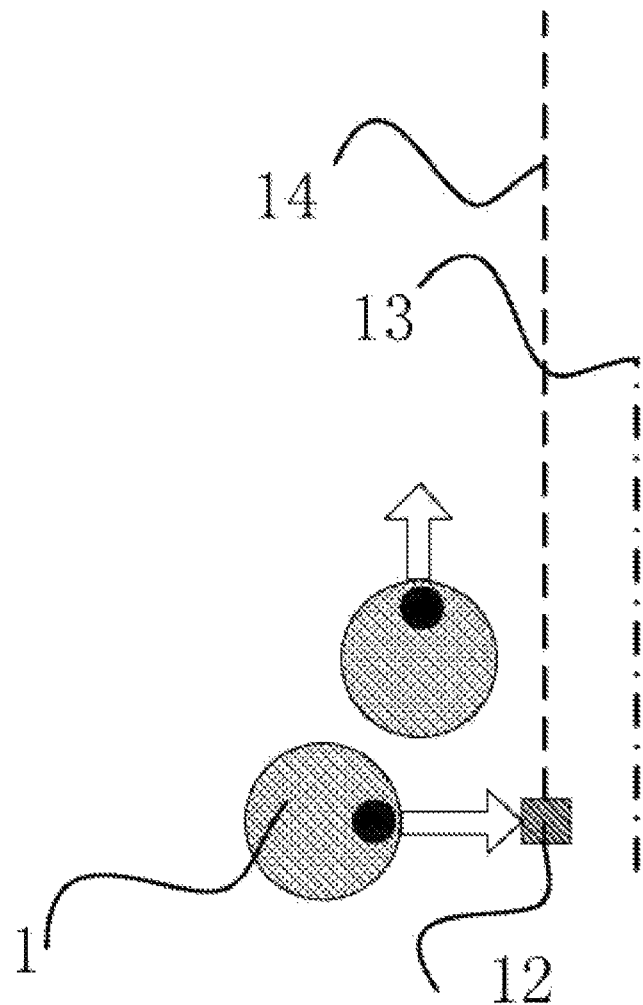
FIG. 2 shows a method for predicting a wall surface having a reference wall surface for an internal map in a method for controlling the motion of a robot based on map prediction according to an embodiment of the present disclosure.

At situation one, a complete map is stored inside the robot. The robot knows where the wall surface is. The robot walks toward the wall surface with reference to the wall surface on the map. As shown in FIG. 2, there is a wall surface 13 inside the map, but due to an error, the actual position of the robot and the wall surface still have a little distance. At this time, the robot collides with an obstacle 12. When the error between the obstacle 12 and the wall surface on the map is less than a certain distance, generally 20 cm, a prediction wall surface 14 may be obtained. The wall surface 14 is a straight line based on the position of the currently encountered obstacle. The direction of the straight line is the direction of the original map wall surface. When the wall surface marked on the original map is 0 degree, the obtained angle of the prediction wall surface is also 0 degree.

Figure 3:
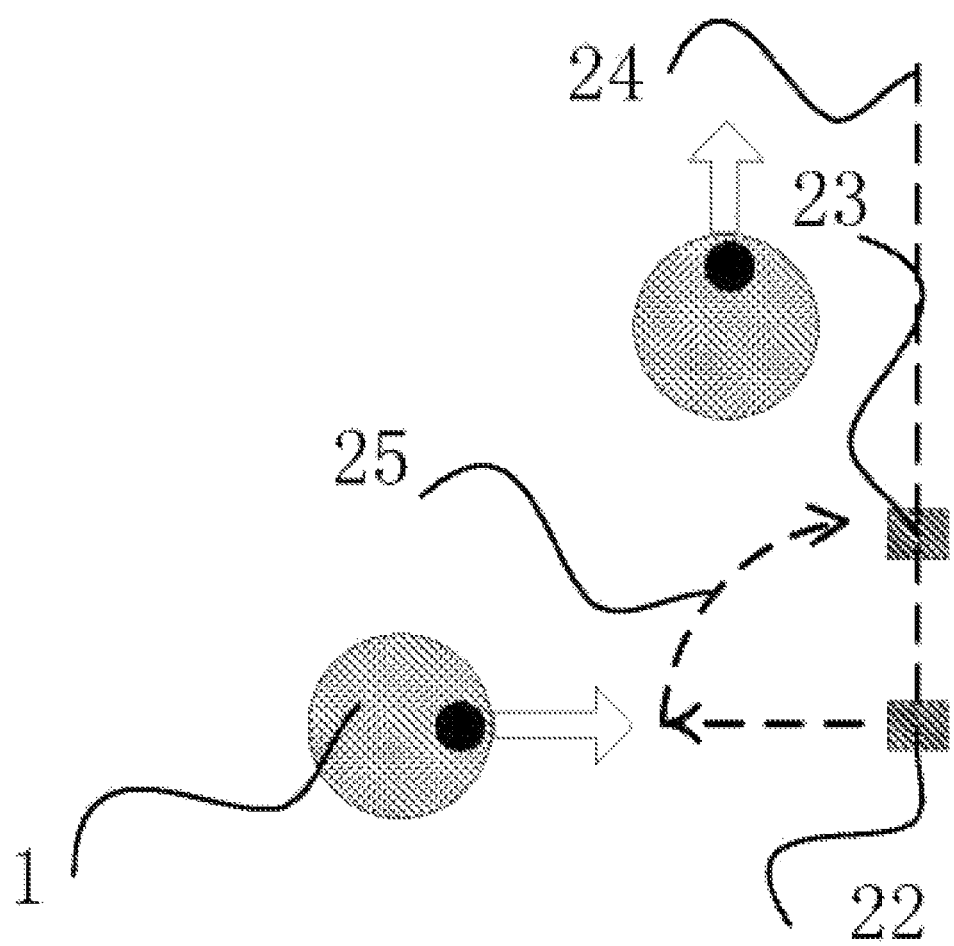
FIG. 3 shows a method for predicting a wall surface without an internal map in a method for controlling the motion of a robot based on map prediction according to an embodiment of the present disclosure.

At situation two, the internal map of the robot is incomplete, but obstacles are detected in the front and the robot walks along the wall surface. At this time, the robot may perform multiple distance detections or collision detections to obtain the trend of the wall surface. The number of collisions depends on the robot sensor settings. When the collision sensor of the robot may accurately obtain the distance of the obstacle, two points may be connected to form a straight line. Each touch point is generally selected as the length of the body of the robot. As shown in FIG. 3, the robot has a touch point 22 first. The robot follows a route 25, retreats for a little distance, such as a quarter of the body, and then turns for an angle, generally 90 degrees. The two wheels walk forward at a variable speed. Generally, the speed of the outer wheel is four times that of the inner wheel, and the robot continuously collides with the touch point 23. Through these two touch points, it is possible to form a straight line. The length of the straight line is ten times the length of the body, and the length is extended as the robot moves. The straight line is a prediction wall surface 24. The robot walks according to the trend of the virtual wall surface, and confirms the existence of the wall surface through a side sensor at intervals. The time interval generally takes a time period when the robot walks for a length of two times the length of the body, and the wall surface is continuously corrected by the information.

Figure 4:
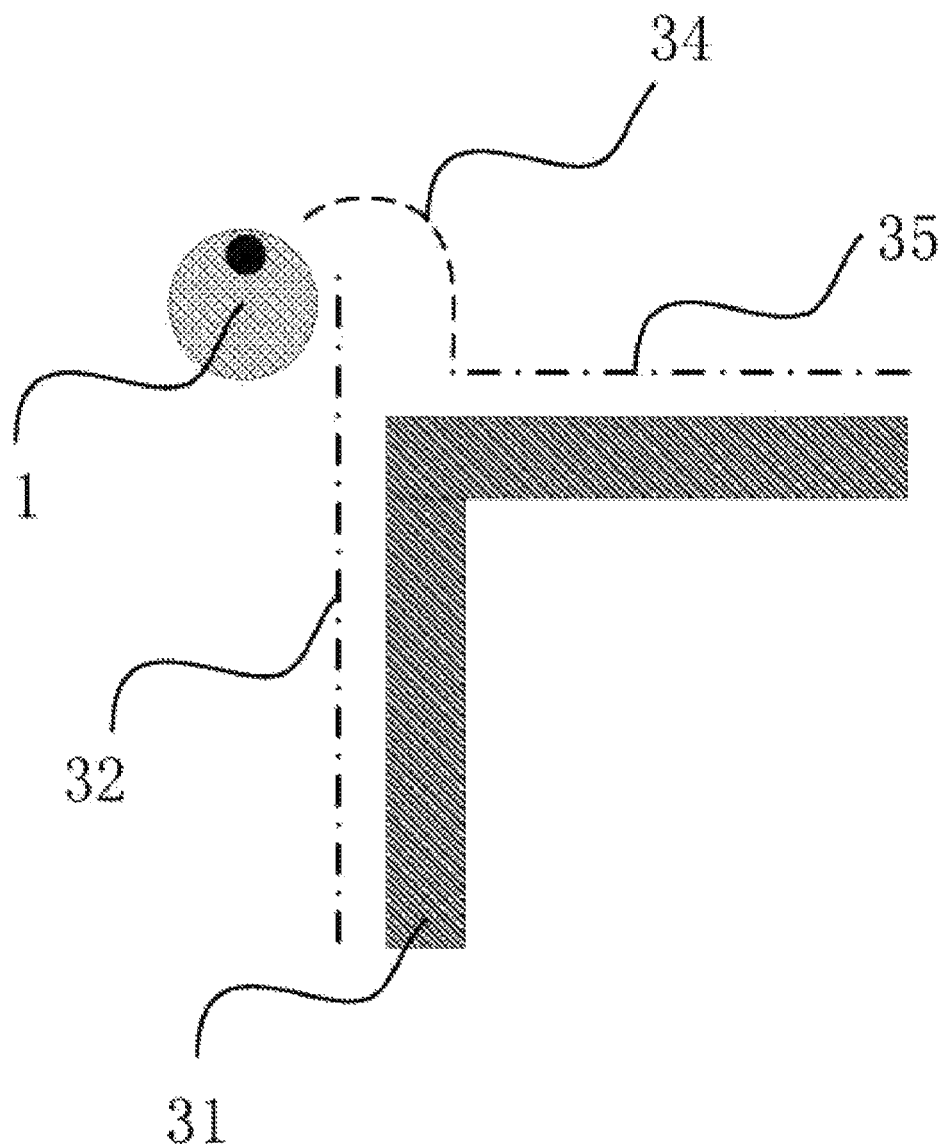
FIG. 4 shows a method for predicting a wall surface for a corner in a method for controlling the motion of a robot based on map prediction according to an embodiment of the present disclosure.

In the above two modes, when the robot walks for a predetermined distance according to a predicted route, no signal is detected in the middle, and a new route is to be re-predicted, as shown in FIG. 4. The robot walks along the predicted route 32. When the robot moves to the position in the figure, no signal is continuously detected, and the robot walks along an arc-shaped route 34 at a variable speed. Generally, the speed of the outer wheel is four times that of the inner wheel, and a new route 35 is re-predicted.

Figure 5:
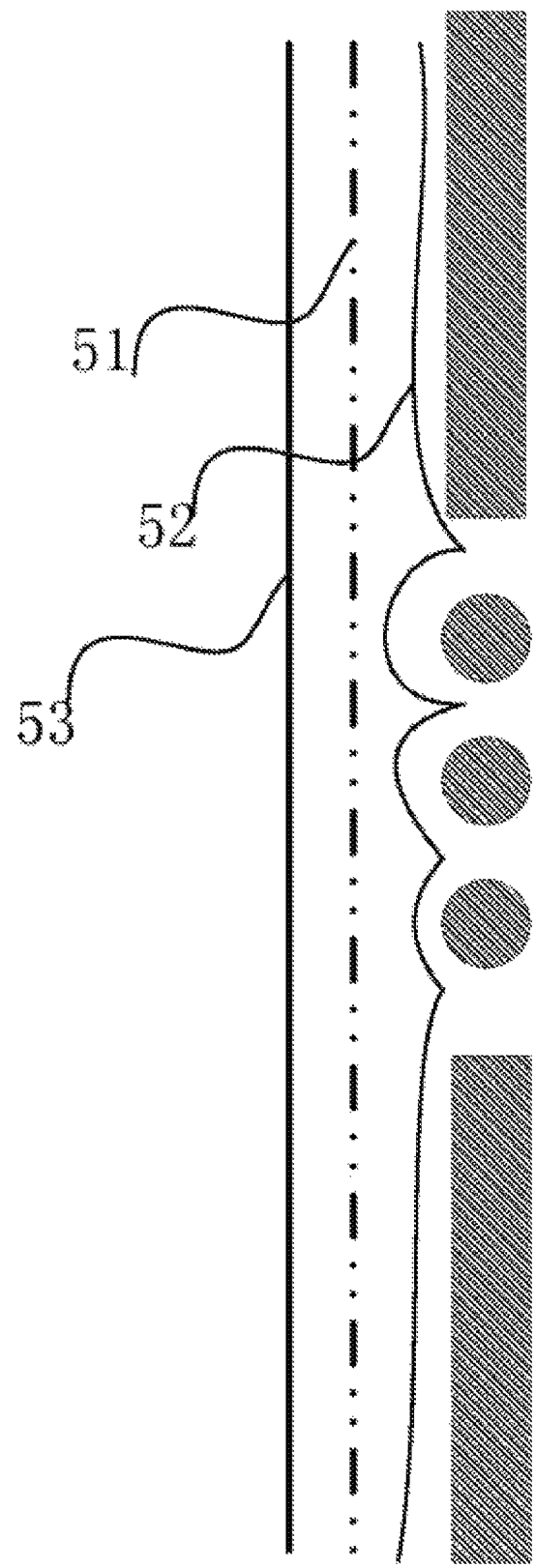
FIG. 5 is a schematic diagram of comparison between a map prediction method and a normal signal following method in a method for controlling the motion of a robot based on map prediction according to an embodiment of the present disclosure.

As an example, as shown in FIG. 5 (where 51 is a wall surface on a map, 52 is a route along which a robot in the related art walks based on a signal, and 53 is a route for the present method based on map prediction), the wall surface is not completely flat, and there are several pillars, similar to a general corridor design. When the robot is completely controlled according to a signal of a side sensor, and the robot walks to the pillar, there will be a short signal loss, the distance will become larger, and the robot will be driven to turn into the pillar. At this time, the route will be twisted, and the robot may collide with the pillar. Since map prediction is a dotted portion, which is a very straight line, the robot of the present disclosure walks according to a predicted route. When the robot passes through the pillar, the robot still walks according to the route. After the robot passes through the pillar, the side sensor returns a signal indicating that the wall surface is still valid, the robot continues to walk by following the predetermined route, and the route of the robot is always straight.

The method for controlling the motion of the robot based on map prediction provided by the present embodiment has the beneficial effects that it can be adapted to various different wall surfaces based on map prediction, including different colors and shapes, thereby reducing an operation time.

The above embodiments are for the purpose of fully disclosing and not limiting the present disclosure, and the substitution of equivalent technical features based on the inventive subject matter and without creative labor should be regarded as the scope of the present disclosure.

What is claimed is:

1. A method for controlling a motion of a robot based on map prediction, the robot in the method comprising a body, left and right action wheels, a main control component, a front collision detection sensor, a left obstacle detection sensor, and a right obstacle detection sensor, the main control component having a map management function and a robot positioning function, the method comprising:

step one, controlling the robot to walk toward a wall surface on a map, when the robot collides with a first touch point of an obstacle, determining whether a distance from the obstacle to the wall surface on the map is less than a set distance A, when the distance is less than a set distance A, determining a straight line L1 with the same angle as the wall surface on the map by taking a position of the obstacle currently collided as a reference point, setting the straight line L1 as a prediction wall surface, controlling the robot to walk along this prediction wall surface, and when the distance is not less than a set distance A, proceeding to step two; and step two, controlling the robot to detect a second touch point of the obstacle at an interval of the first touch point, when there is a second touch point, determining a straight line L2 according to the two touch points, setting the straight line L2 as a prediction wall surface, controlling the robot to walk along this prediction wall surface, and otherwise, returning to step one, wherein in a process of controlling the robot to walk along the prediction wall surface, an obstacle detection sensor, which is located at one side of the robot and relative to the prediction wall surface, is used for detecting whether the obstacle at this side is present at a set time interval T, when an obstacle signal is not detected continuously, the robot is controlled to walk along an arc-shaped route toward the inside of the prediction wall surface, and the process returns to step one.

2. The method for controlling the motion of a robot based on map prediction as claimed in claim 1, wherein the interval between the two touch points is a length of the body.

3. The method for controlling the motion of a robot based on map prediction as claimed in claim 1, wherein step two is further performed as follows: controlling the robot to perform at least two interval distance detections on the obstacle, when obstacle points are detected by the at least two interval distance detections, determining a straight line L2 between two obstacle points acquired by two distance detections, setting the straight line L2 as a prediction wall surface, controlling the robot to walk along this prediction wall surface, and when obstacle points are not detected by the at least two interval distance detections, returning to step one.

4. The method for controlling the motion of a robot based on map prediction as claimed in claim 1, wherein step two is further performed as follows: controlling the robot to perform at least two interval touch point detections on the obstacle, when there is a second touch point, determining a straight line L2 according to a comprehensive trend of all touch points, setting the straight line L2 as a prediction wall surface, controlling the robot to walk along this prediction wall surface, and when there is not the second touch point, returning to step one.

5. The method for controlling the motion of a robot based on map prediction as claimed in claim 1, wherein detecting the second touch point comprises: controlling the robot to retreat from the first touch point by a set distance B, controlling the robot to rotate by a set angle Q, and controlling the robot to walk along an arc-shaped route toward a side of the obstacle to find the second touch point.

6. The method for controlling the motion of a robot based on map prediction as claimed in claim 5, wherein the set distance B is one quarter of the body, the set angle Q is 90 degrees, controlling the robot to walk along an arc-shaped route toward the obstacle side comprises: controlling action wheels located at a side, which is far away from the obstacle, of the robot to travel at a four-time speed relative to action wheels located at a side, which is near to the obstacle, of the robot.

7. The method for controlling the motion of a robot based on map prediction as claimed in claim 1, wherein an initial length of the straight line L2 is ten times a length of the body.

8. The method for controlling the motion of a robot based on map prediction as claimed in claim 1, wherein the set time interval T takes a time period when the robot walks for a distance of two times a length of the body.

9. The method for controlling the motion of a robot based on map prediction as claimed in claim 8, wherein the situation that an obstacle signal is not detected continuously means that no obstacle signal is detected for two set time intervals T.

10. The method for controlling the motion of a robot based on map prediction as claimed in claim 1, wherein controlling the robot to walk along the arc-shaped route toward the prediction wall surface comprises: controlling the action wheels located at a side, which is far away from the prediction wall surface, of the robot to travel at a four-time speed relative to action wheels located at a side, which is near to the prediction wall surface, of the robot.

* * * * *